Aug. 21, 1934.  L. MIAN  1,971,014
WORK OF ART AND METHOD OF MAKING THE SAME
Filed April 11, 1933   2 Sheets-Sheet 1
Fig. 1.
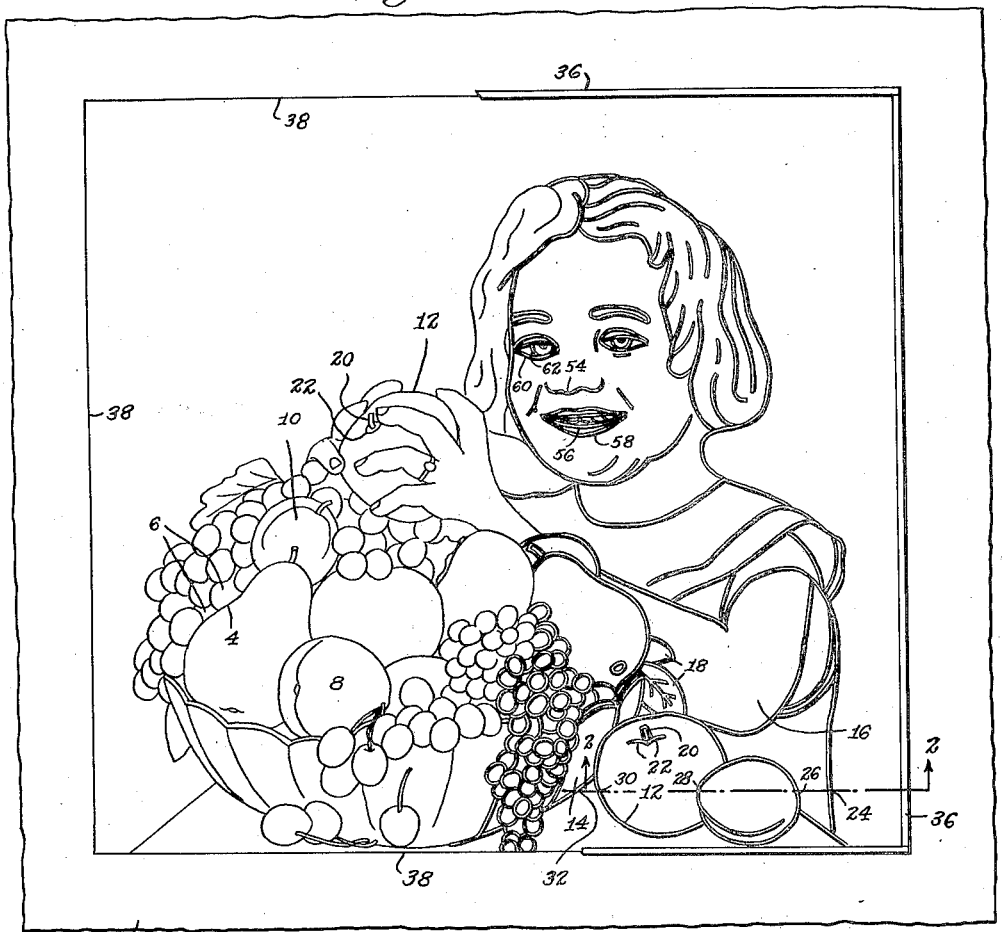
Fig. 2.
Fig. 3.
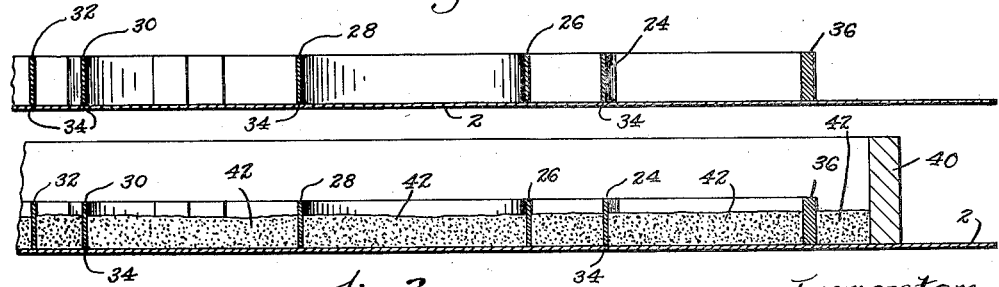
Inventor
Luigi Mian
by David Rines
Attorney

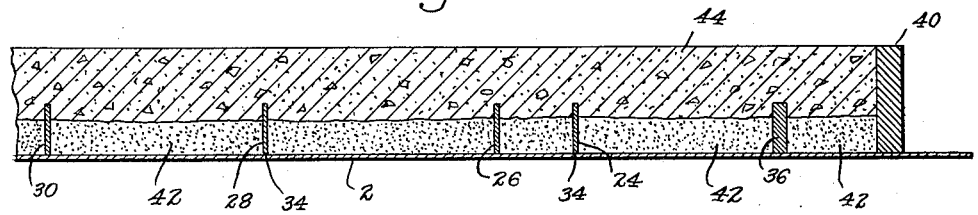
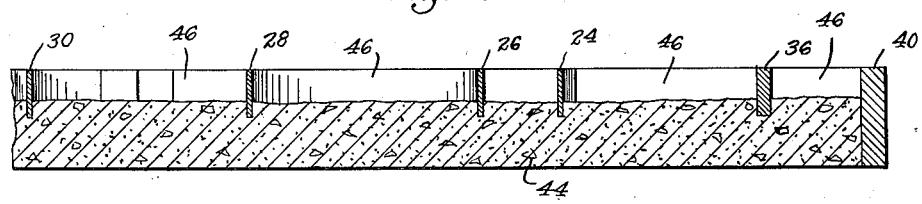
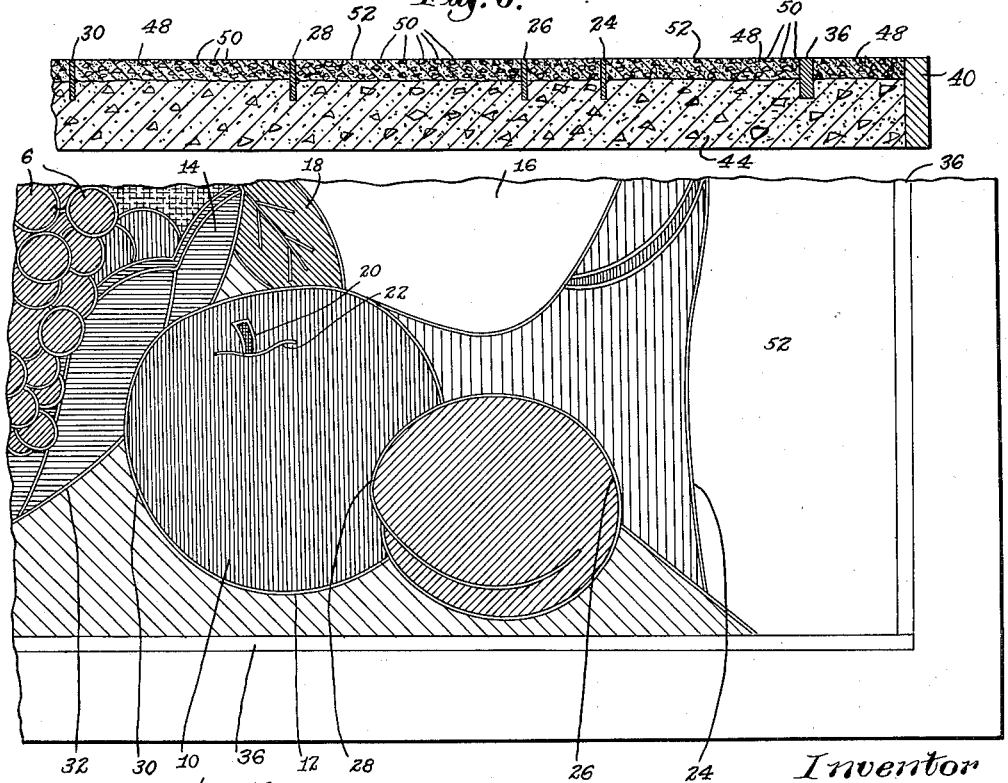

Patented Aug. 21, 1934

1,971,014

UNITED STATES PATENT OFFICE 1,971,014

WORK OF ART AND METHOD OF MAKING THE SAME

Luigi Mian, Roxbury, Mass.

Application April 11, 1933, Serial No. 665,534

12 Claims. (Cl. 41—31)

The present invention relates to works of art, particularly plastic products and the like, and to a method of making the same.

The chief object of the invention is to improve upon present-day art products and methods of the above-described character, to the ends that their esthetic effects may be enhanced and greater approximation to reality may be obtained. Other and further objects will be explained hereinafter and will be particularly pointed out in the appended claims.

With these ends in view, the invention consists of a work of art and a method of making the same a preferred embodiment of which is hereinafter described, illustrated in the accompanying drawings and defined in the appended claims.

In the accompanying drawings, Fig. 1 is a view of a painting, drawing, or other work of art, having placed thereon, over preselected lines thereof, a plurality of metal strips, as the first step in the method, in accordance with the present invention; Fig. 2 is a section taken upon the line 2—2 of Fig. 1, looking in the direction of the arrows, but upon a greatly enlarged scale; Fig. 3 is a section, similar to Fig. 2, showing a further step in the method; Figs. 4, 5 and 6 are similar sections, illustrating further steps of the present method; and Fig. 7 is a fragmentary view of the completed product, upon a still larger scale.

In Fig. 1, there is shown a paper, canvas or other sheet 2 upon which is painted, drawn or otherwise produced, a picture, portrait or the like which it is desired to reproduce in accordance with the present invention. The picture has a large number of lines separated by different colors; for example, the line 4 is the boundary of a pear. Within this boundary line 4, the likeness of the pear will be painted a pear color, but without this boundary line there will be other colors corresponding to the colors of grapes 6, peaches 8, apples 10, etc. Each of these pieces of fruit, furthermore, will be enclosed by similar boundary lines. For example, the boundary line 12 encloses an apple, and separates this apple from a plum at the right, the glass vase 14 at the left and a child's arm 16 and leaves 18 at the top, toward the right. Even within the boundary of this apple, there are lines 20 enclosing the stem of the apple, as well as lines 22 representing a further boundary line. All these various boundary lines, such as those indicated at 4, 12, 20 and 22, will hereinafter be referred to as preselected lines of a work of art displayed on the sheet 2.

To reproduce this work of art, a number of thin strips, preferably made of metal, such as brass, are superposed over each of the preselected lines before mentioned. Some of the strips are shown at the right of Fig. 1 superposed over some of the preselected lines. The numerals 12, 20 and 22, in fact, have lead lines to these superposed strips. At the left of Fig. 1, the preselected lines are shown without any strips superposed thereover. The boundary line 4 of the pear, for example, has not yet had any strip placed thereover.

As shown more particularly in Figs. 2 to 6, these strips, shown more particularly in cross section in these figures at 24, 26, 28, 30 and 32 extend upward perpendicularly to the horizontal plane of the sheet 2, in substantially parallel, vertical directions, from the preselected lines over which they are superposed. The strips are secured to the sheet 2 in any desired way. Because the strips are so excessively thin and light, they will not ordinarily remain in place unless secured. One suitable way of securing them is to glue the strips to the sheet 2 at 34 where the strips contact with the sheet 2. Care must be taken that the strips follow the preselected lines of the work of art perfectly, and that they are glued along such lines with absolute correctness. In such case, it is desirable to utilize for this purpose, not the original work of art, but a duplicate of the same, traced or otherwise reproduced previously upon a separate sheet of paper or the like. It is possible, however, to use the original work of art without damaging the same, as by interposing between the strips and the work of art 2 a transparent medium, such as glass or celluloid. It is preferred, however, to glue the strips directly to the sheet 2 over the preselected lines, as before stated.

A further similar strip 36, of gerater thickness than the other strips, is similarly placed along the border line 38 of the work of art, and a mold 40 is positioned on the sheet 2, in similar fashion, outside the whole.

The next step is to place a filler 42 in the spaces between the strips and between the strips and the walls of the mold 40, as indicated in Fig. 3. This filler may be inserted to any desired depth, say, ⅛ of an inch to half the height of the brass strips. The filler may be made of any desired material, such as dry sand. The remainder of the space in the mold and between the strips, to at least ¼ of an inch above the tops of the brass strips, is then filled with liquid concrete, as shown at 44 in Fig. 4. The concrete is now permitted to set and harden, after which the sheet 2 is removed and the sand poured out of the mold. The sheet 2 may be removed easily by lifting a corner and pulling the sheet gently away. The sand may be removed merely by tapping the product and permitting the dry sand to fall out. The resulting structure, but turned upside down, as compared with Figs. 2, 3 and 4, is shown in Fig. 5, the spaces 46 between the strips being the spaces formerly occupied by the sand.

In these spaces 46, cement 48 is now poured, care being taken that between each two strips the color of the cement shall be the same as the color of the original work of art 2 between the corresponding preselected lines. If desired, and preferably, a large number of exceedingly small, marble chips 50 of corresponding color may be intermingled with the cement. As the color of the original object 2, between any two preselected lines, is usually of varying shades, the cement 48 and marble chips 50 are worked and touched up to correspond to the original shades. This may be done by manipulating the cement and marble chips with a proper tool so as to have the cement and marble chips in certain portions of the spaces between these strips more dilute than in other spaces.

The cement is now permitted to harden. After hardening, the strips and the chips 50 will be embedded in the cement. The whole surface 52, comprising the cement 48, the chips 50 and the metal strips, is now polished or rubbed down until the surface presents a very smooth, polished appearance.

The resulting product is a work of art that simulates very closely the original work of art.
By reason of the fact that the metal strips are so relatively fine and thin, they do not show up as strips or as boundary lines but have, rather, the same appearance as the corresponding preselected lines of the original work of art.
Every original such preselected line has its counterpart in the line produced by a corresponding brass strip. In the resulting product, therefore, it is the brass strips, instead of the lines, that separate the various colors of the work of art. Every detail of the original work of art is reproduced faithfully in the new work of art. For example, one curved brass strip in the final product will represent the outline of the child's nose, as shown at 54, in Fig. 1. Upper and lower curved brass strips 56 and 58 will represent the outlines of a child's lip. Another brass strip 60, properly curved, will represent the outline of an eye, and a circular brass strip 62 will represent the outline of a pupil.
The space between the brass strips 56 and 58 will, for example, contain red, hardened cement. Within the brass strip 62 the color might be blue, etc. Similarly, the color within the boundary line 12 will be that corresponding to an apple. In some cases, the color will be of the same hue throughout between the corresponding brass strips. In other cases, however, it will be of varying hue, corresponding to the original.
The space between the wall of the mold 40 and the relatively thick brass strip 36, as shown in Fig. 3, is not necessarily treated in the same way as the cement of the work of art, as before described. If desired, the mold 40 may be omitted during the process before outlined, with the result that the boundary of the completed product will be the relatively thick strip 36. It will then be possible to secure integrally to the outside of the strip 36 an artificial stone molding, in any desired way known to persons skilled in the art.

Modifications will obviously occur to persons skilled in the art and all such are considered to fall within the spirit and scope of the invention as defined in the appended claims.

What is claimed is:

1. A method of reproducing a work of art having lines that are separated by different colors that comprises superposing a plurality of thin strips over said lines, fixing the strips to the work of art in superposed relation, placing a filler on the work of art to a predetermined depth between the strips, filling the remainder of the space between the strips with concrete, permitting the concrete to harden, removing the work of art and the filler, pouring in so much of the spaces between the strips as was formerly occupied by the filler cement of colors corresponding to said different colors, changing the shade of the colored cement in the spaces between the strips to correspond to the shade of the colors in the work of art, and permitting the cement to harden with the strips embedded therein.

2. A method of reproducing a work of art having lines that are separated by different colors that comprises superposing upon a support and over preselected lines of the work of art that are visible on the support a plurality of thin strips to simulate the said preselected lines of the work of art, fixing the strips as so superposed, placing a temporary filler on the support to a predetermined depth between the strips, filling the remainder of the space between the strips with a plastic, permitting the plastic to harden, removing the support and the filler, pouring in so much of the spaces between the strips as was formerly occupied by the filler a mixture of cement and small chips of colors corresponding to said different colors, and permitting the cement to harden with the strips and the chips embedded therein.

3. A method of reproducing a work of art having lines that are separated by different colors that comprises superposing upon a support and over preselected lines of the work of art that are visible on the support a plurality of thin strips to simulate the said preselected lines of the work of art, placing a temporary filler on the support to a predetermined depth between the strips, filling the remainder of the space between the strips with a plastic, permitting the plastic to harden, removing the support and the filler, pouring in so much of the spaces between the strips as was formerly occupied by the filler cement and small chips of colors corresponding to said different colors, and permitting the cement to harden with the strips and the chips embedded therein.

4. A method of reproducing a work of art having lines that are separated by different colors that comprises superposing upon a support and over preselected lines of the work of art that are visible on the support a plurality of thin strips to simulate the said preselected lines of the work of art, placing a temporary filler on the support to a predetermined depth between the strips, filling the remainder of the space between the strips with a plastic, permitting the plastic to harden, removing the support and the filler, pouring in so much of the spaces between the strips as was formerly occupied by the filler cement of colors corresponding to said different colors, changing the shade of the colored cement in the spaces between the strips to correspond to the shade of the colors in the work of art, and permitting the cement to harden with the strips embedded therein.

5. A method of reproducing a work of art that comprises superposing a plurality of thin strips over preselected lines of the work of art so that the strips extend in substantially parallel directions from said lines, placing a filler on the work of art to a predetermined depth between the strips, filling the remainder of the space between the strips with concrete, permitting the concrete to harden, removing the work of art and the filler, pouring cement in so much of the spaces between the strips as was formerly occupied by the filler, and permitting the cement to harden with the strips embedded therein.

6. A method of reproducing a work of art that comprises superposing a plurality of thin strips over preselected lines of the work of art that are separated by different colors so that the strips extend in substantially parallel directions from said lines, fixing the strips in superposed position on the work of art, placing a filler on the work of art to a predetermined depth between the strips, filling the remainder of the space between the strips with concrete, permitting the concrete to harden, removing the work of art and the filler, pouring in the spaces between the strips that was formerly occupied by the filler cement of colors corresponding to the said different colors, and permitting the cement to harden with the strips embedded therein.

7. A method of reproducing a work of art that comprises superposing a plurality of thin strips over preselected lines of the work of art that are separated by different colors so that the strips extend in substantially parallel directions from said lines, fixing the strips in superposed position on the work of art, placing a filler on the work of art to a predetermined depth between the strips, filling the remainder of the space between the strips with concrete, permitting the concrete to harden, removing the work of art and the filler, pouring in the spaces between the strips that were formerly occupied by the filler cement and small marble chips of colors corresponding to said different colors, changing the shade of the colored cement in the spaces between the strips to correspond to the shade of the colors in the work of art, and permitting the cement to harden with the strips embedded therein.

8. A method of reproducing a work of art that comprises superposing a plurality of thin strips over preselected lines of the work of art that are separated by different colors so that the strips extend in substantially parallel directions from said lines, fixing the strips in superposed position on the work of art, placing a filler on the work of art to a predetermined depth between the strips, filling the remainder of the space between the strips and above the strips with concrete, permitting the concrete to harden, removing the work of art and the filler, pouring in the spaces between the strips that were formerly occupied by the filler cement and small marble chips of colors corresponding to said different colors, changing the shade of the colored cement in the spaces between the strips to correspond to the shade of the colors in the work of art, permitting the cement to harden with the strips and the chips embedded therein, and polishing the surface of the completed product.

9. A work of art that comprises a plurality of thin strips separating hardened cement of different colors and within which the strips are embedded, small chips being also embedded in the cement.

10. A work of art that comprises a plurality of thin strips embedded in a concrete base extending from the bottoms of the strips part way toward the tops of the strips, cement of different colors being hardened in the remaining space between the strips, small marble chips of corresponding colors being also embedded in the cement.

11. A method of reproducing a work of art that comprises superposing upon a support and over preselected lines of the work of art that are visible on the support a plurality of thin strips to simulate the said preselected lines of the work of art, placing a temporary filler on the support to a predetermined depth between the strips, filling the remainder of the space between the strips with concrete, permitting the concrete to harden, removing the support and the temporary filler, and placing a permanent filler in so much of the spaces between the strips as was formerly occupied by the temporary filler.

12. A method of reproducing a work of art that comprises superposing upon a support and over preselected lines of the work of art that are visible on the support a plurality of thin strips to simulate the said preselected lines of the work of art, placing a filler on the support to a predetermined depth between the strips, filling the remainder of the space between the strips with a plastic, permitting the plastic to harden, removing the support and the filler, pouring a second plastic in so much of the space between the strips as was formerly occupied by the filler, and permitting the second plastic to harden with the strip embedded therein.

LUIGI MIAN.